United States Patent [19]

Rosenblad

[11] Patent Number: 5,417,805
[45] Date of Patent: May 23, 1995

[54] BRUSHED FILM EVAPORATOR

[76] Inventor: Axel E. Rosenblad, 77 Bayside Dr., Atlantic Highlands, N.J. 07716

[21] Appl. No.: 28,659

[22] Filed: Mar. 9, 1993

[51] Int. Cl.6 .......................................... B01D 1/22
[52] U.S. Cl. .............................. 159/13.1; 159/25.2; 159/27.1; 159/28.6; 159/43.1; 159/49; 159/DIG. 32; 165/115
[58] Field of Search .............. 159/43.1, 28.6, 13.1, 159/49, 33, 13.3, DIG. 32, 27.1, 25.2; 203/89; 202/236, 235; 165/164, 115, 93

[56] References Cited

U.S. PATENT DOCUMENTS

| | | | |
|---|---|---|---|
| 3,291,704 | 12/1966 | Diedrich et al. | 159/13.1 |
| 3,332,855 | 7/1967 | Watt | 159/6.3 |
| 3,334,680 | 8/1967 | McManus | 159/6.3 |
| 3,366,158 | 1/1968 | Rosenblad | 159/13.3 |
| 3,549,334 | 12/1970 | Schneider et al. | 159/6.3 |
| 3,878,029 | 4/1975 | Baird et al. | 159/6.3 |
| 3,897,218 | 7/1975 | Busweiler | 159/6.3 |
| 3,976,431 | 8/1976 | Boggs et al. | 159/6.3 |
| 3,995,298 | 11/1976 | Vandeputle et al. | 159/DIG. 6 |
| 4,184,911 | 1/1980 | Koda et al. | 159/6.3 |
| 4,255,232 | 3/1981 | Ries | 159/47.1 |
| 4,940,134 | 7/1990 | Aoki et al. | 159/47.3 |

FOREIGN PATENT DOCUMENTS

| | | | |
|---|---|---|---|
| 2840481 | 3/1980 | Germany | 159/6.3 |
| 0598758 | 2/1948 | United Kingdom | 159/6.3 |
| 1505674 | 3/1978 | United Kingdom | 159/6.3 |
| 1031442 | 7/1983 | U.S.S.R. | 159/6.3 |

Primary Examiner—Virginia Manoharan
Attorney, Agent, or Firm—Brooks Haidt Haffner & Delahunty

[57] ABSTRACT

Liquid to be evaporated by the indirect transfer of heat from a heating medium within plate type heat exchange elements is distributed over outer surfaces of the plate type elements by means of one or more brushes mounted for movement over the heating surface. Horizontally and vertically moving brush assemblies are described and shown.

4 Claims, 4 Drawing Sheets

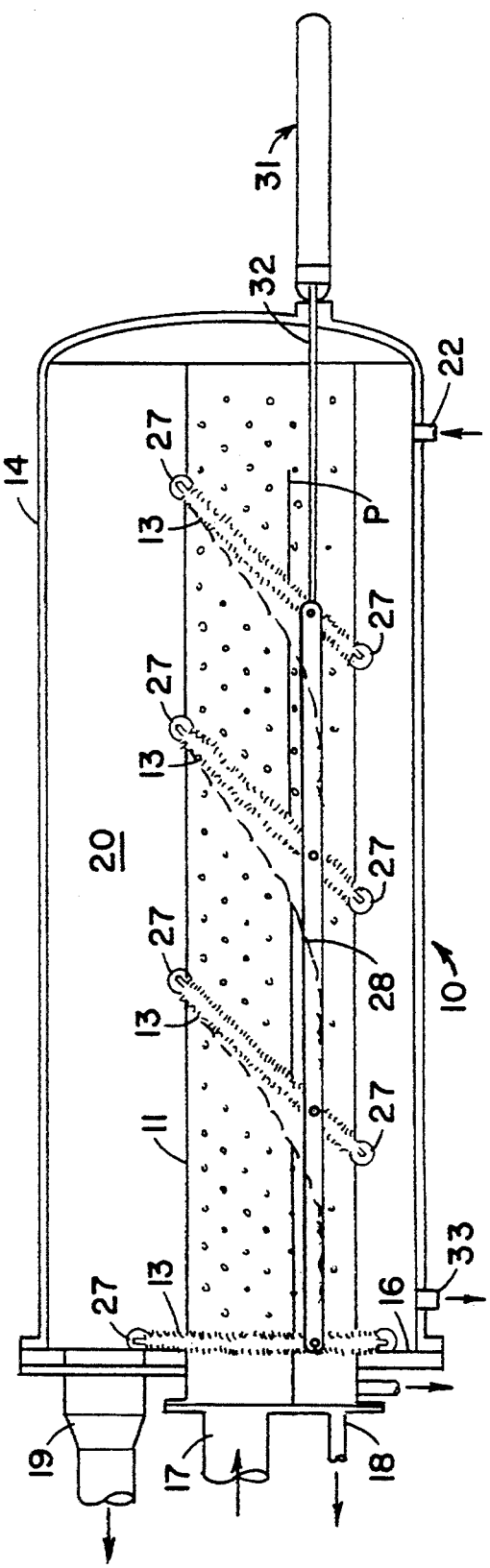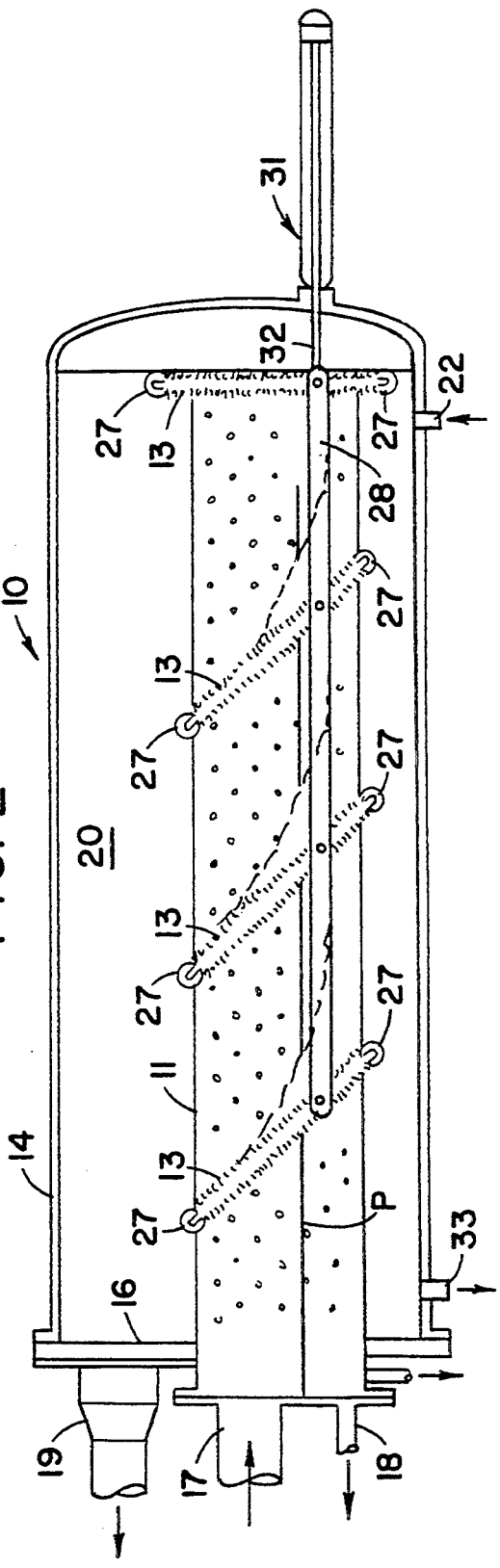

BRUSHED FILM EVAPORATOR

BACKGROUND OF THE INVENTION

1. Field of the Invention

The invention relates to indirect heat transfer plate type film evaporators for the concentration of liquids and more particularly to the use of brush assemblies for distributing liquid to heating surfaces and for cleaning the heating surface.

2. Description of the Prior Art

Falling film evaporators and condensers that employ plate type heat exchange elements are known, as shown, for example in U.S. Pat. No. 3,366,158, granted Jan. 30, 1968. A method for making plate type heat exchange elements that comprise pairs of plates sealed together around their peripheries, leaving a zone within the peripheries free to accomodate heating fluid flow, is described in U.S. Pat. No. 3,512,239, granted May 19, 1970.

Artisan Industries, Inc. of Waltham, Mass., and others, supply wiped film evaporators comprising a jacketed cylinder in which film is scraped off the cylinder wall by a metallic knife. Such evaporators are of small capacity and usually operate at very high temperature differentials. Often the product of such wiped film evaporators is a dry powder rather than a liquid condensate.

Such prior art evaporators do not use brushes to serve the dual functions of distributing liquid as film to heating surface and cleaning the heating surface.

SUMMARY OF THE INVENTION

Plate type falling film evaporators according to the invention have moving brushes for distributing a liquid to the heating surfaces to fall down the surfaces as a film for evaporation by indirect transfer of heat from a heating medium within the plate type elements. The moving brushes also clean the heating surface as they pass over the surface. This cleaning action is especially beneficial when the evaporator is used for concentrating a solution that contains dissolved or suspended solids that can form deposits on the heating surface, impeding heat transfer, disturbing film flow, and even blocking spaces between plate type elements. The removal of such deposits before any substantial build-up can occur, overcomes drawbacks of falling film evporators of the prior art.

An evaporator according to the invention can comprise a plurality of spaced, generally parallel, plate type elements. Each element consists of a pair of spaced, parallel plates, joined together about their peripheries, as by welding. The plates of the heating elements can also have opposed dimples for resisting pressure differences between the interior spaces and the exterior vapor body that surrounds the plates. Each plate element also has an inlet for a heating medium such as steam, and outlets for condensate and vent gases.

Brushes are moved over the surfaces of the plate elements by means such as a reciprocating piston and cylinder, a screw, a belt or other suitable mechanical actuating means. In a horizontally arranged array of plate elements, the brushes traverse the heating surface at an angle with respect to the vertical so that the brushes slant away from the direction of their travel across the surface. A vertical arrangement of heating elements in which brush assemblies act as scoops that lift material to the top of the heating surface while scrubbing the heating surface is also described and shown.

A housing of the evaporator has a vapor outlet and an entrainment separator associated with the vapor outlet as well as an inlet for feed liquid to be concentrated and an outlet for concentrated liquid.

These and other features and advantages of the brushed film evaporator of the invention will be more fully understood when the following detailed description of preferred embodiments is read in conjunction with the accompanying figures of the drawings.

BRIEF DESCRIPTION OF THE DRAWINGS

FIG. 1 is a side view, in section of a horizontal brushed film evaporator according to the invention with the brush assemblies at their extreme left position.

FIG. 2 is a view similar to that of FIG. 1, but with the brush assemblies at their extreme right position.

DETAILED DESCRIPTION OF PREFERRED EMBODIMENTS

The several embodiments of the brushed film evaporator shown and described all employ one or more moving brushes to distribute a liquid to be evaporated over the outer surfaces of plate type heat exchange elements or envelopes. The use of such plate type heat exchange elements, in which a heating medium such as steam within the element serves indirectly to heat and evaporate a liquid distributed as a film on the outer surfaces of the plate element, is well known.

Figure 4:
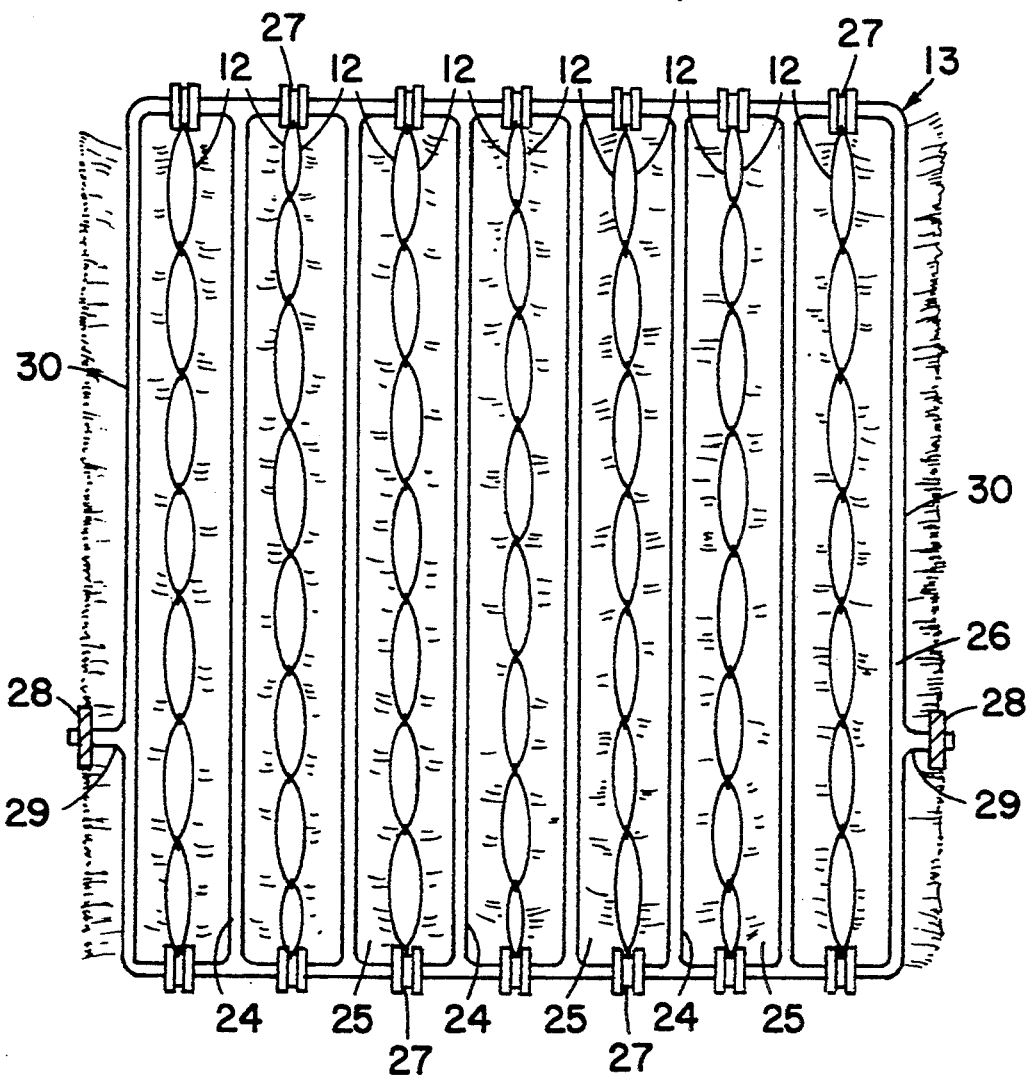
FIG. 4 is an end view, in section of plate type heat exchange elements and a brush assembly of FIGS. 1 and 2.

FIGS. 1 and 2 illustrate a brushed film evaporator generally designated by the reference numeral 10 in which plate type heat exchange elements 11 are arranged horizontally. A plurality of spaced plate type elements 11 are arranged parallel to each other with spaces between the outer surfaces of the plates 12 of adjacent elements 11, as shown in FIG. 4. One or more brush assemblies, generally designated by the reference numeral 13, are mounted to move along the length of the spaced plate elements 11. Four such brush assemblies 13 are shown in FIGS. 1 and 2. The brush assemblies 13 distribute liquid to the surfaces of the plates 12 of the plate elements 11 and also serve to keep the plate surfaces clean, preventing any build-up of solid deposits on the heating surface of the plates 12.

Figure 3:
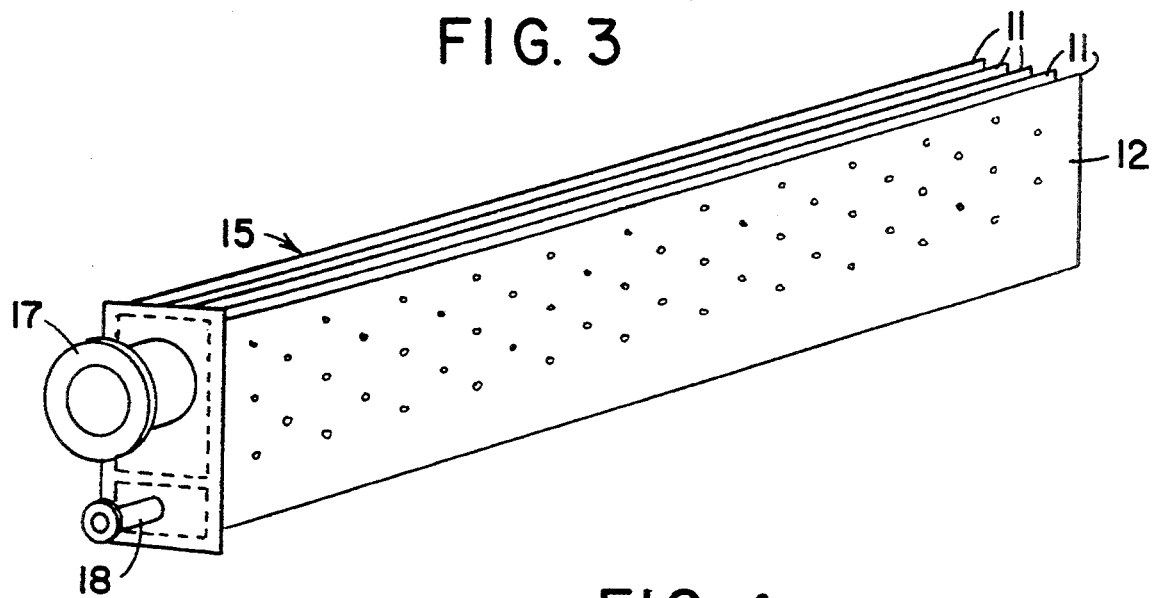
FIG. 3 is a view in perspective of a stack or bundle of plate type heat exchange elements employed in preferred embodiments of the brushed film evaporator of the invention.

FIGS. 1 and 2 show that the evaporator 10 has a housing or casing 14 which can be cylindrical or rectangular in transverse section. A plurality of spaced, separated plate heat exchange elements 11 are mounted parallel to each other and extend substantially along the full length of the housing 14. The plate elements 11 can be secured together as an element stack or bundle 15 as shown in FIG. 3, where a small number of elements 11 constitute an element bundle 15. The number of elements 11 can, of course, be considerably larger than the number shown in FIG. 4.

One preferably flat end wall 16 of the housing 14, as shown in FIGS. 1 and 2, accomodates an entry conduit 17 for feeding a heating medium such as steam to the interiors of all of the heat exchange elements 11, as well as an outlet 18 for vent gases and an outlet 19 for vapors generated within the housing 14 by the evaporation of liquid by indirect heat exchange with the heating medium within the elements 11. The housing 14 has an open space 20 above the upper edges of the elements 11 where a body of vapors generated by evaporation can pass freely away from the elements 11 before exiting via the vapor outlet conduit 19. An entrainment separator (not illustrated in FIGS. 1 and 2) can be provided to separate any liquid entrained in the vapors collected in the space 20 before the vapors pass through the outlet 19.

Liquid to be evaporated enters the housing through inlet pipe 22. Concentrated product liquid exits the housing via outlet pipe 23 as shown in FIGS. 1 and 2. The level of liquid within the housing 14 is sufficiently high that lower portions of the heating elements 11 are normally immersed in the pool of liquid at the bottom of the housing 14 as shown in FIGS. 1 and 2. Upper portions of the elements 11 are brushed with liquid picked up from the liquid pool by the passage of the brush assemblies 13 over the plates 12.

Steam or other heating fluid enters through the conduit 17 into the interior spaces of the plate elements 11 and provides heat to evaporate liquid on the surfaces of the element plates 12. Vapors generated by the evaporation of liquid on the heating surfaces of the elements 11 rises into the space 20 and passes out of the housing 14 via the outlet 19. The conduits 17, 18 and 19 are all illustrated in FIGS. 1 and 2 as being located at the same end of the housing 14, passing through housing end wall 16, but one or more of these conduits could, if desired, be located at the other end of the housing 14, that is, at the right hand end in the illustrations of FIGS. 1 and 2.

When the evaporator has the vapor inlet 17 and the vent gas outlet 18 located at the same end of the plate elements as shown in FIGS. 1-3, each plate element 11 can have an internal horizontal partition P extending between the inner surfaces of the opposed plates 12 along most of the length of element 11, so that heating medium entering through the inlet 17 will traverse the element's interior space and then reverse flow direction to return and exit through the vent outlet 18.

In the preferred embodiment of FIGS. 1, 2 and 4, the brush assemblies 13 each comprise a plurality of spaced, parallel ribs 24 to which flexible bristles 25 are attached. The movement of the brush assemblies 13 causes the free ends of the bristles 25 to sweep over the surfaces of the plates 12, causing liquid to be evaporated to the heating surface while removing deposited solids from the plates 12. FIG. 4 shows that each brush assembly 13 can be formed of a generally rectangular frame 26 supporting the parallel ribs 24 from which the brush bristles 25 extend. The bristles 25 can be made of metal wire, nylon, kevlar, or other material selected to withstand exposure to elevated temperatures and the properties of the liquid being evaporated.

The frame 26 has rollers 27 which ride on the upper and lower edges of the plate elements 11 as the brush assembly 13 moves horizontally back and forth as shown in FIGS. 1 and 2. Several brush assemblies 13 can be interconnected to move in unison by pivotally connecting each frame 26 to a horizontally reciprocable rod 28 extending along each longitudinal side of the frame 26. For this purpose the frames 26 can have horizontal pins 29 extending from the lower portions of the frame sides 30.

In FIGS. 1 and 2 and horizontally reciprocating rods 28 are actuated by a piston and cylinder assembly generally designated by reference numeral 31, the piston 32 of which piston and cylinder assembly is connected to an end of the rod 28 for moving the brush assemblies 13 back and forth between the extreme positions shown in FIGS. 1 and 2. This reciprocating movement keeps the frames 26 at a slant with respect to the plate elements 11 as the bundles 25 pass over the plates 12. The lower roller 27 leads the upper roller 27 as shown in FIGS. 1 and 2. When a brush frame 26 reaches the end of its travel as shown at the left in FIG. 1 and at the right in FIG. 2 the frame moves to a vertical orientation, assuring contact of the bristles 25 with upper end corners of the plates 12. Then the rod 28 reverses its direction of movement, carrying the frames 26 back in the opposite direction.

As the brush assemblies 13 transit the length of the heating elements 11 of the element stack or package 15 the bristles 25 push liquid up into contact with the upper areas of the plates 12 as shown in FIGS. 1 and 2, coating the outer surfaces of the plates 12 with a film of liquid to be evporated by indirect transfer of heat from the heating medium within the plate type elements 11.

If a heating medium such as steam is employed, condensate from the vapor condensed within the elements 12 can be drained off through an outlet 33 shown at the left in FIGS. 1 and 2. Of course this outlet could be at either end of the housing 14. Headers are provided to distribute heating medium from the inlet 17 to all of the elements 11 and to interconnect all of the elements 11 with the vent outlet 18 and the condensate outlet 33.

Figure 5:
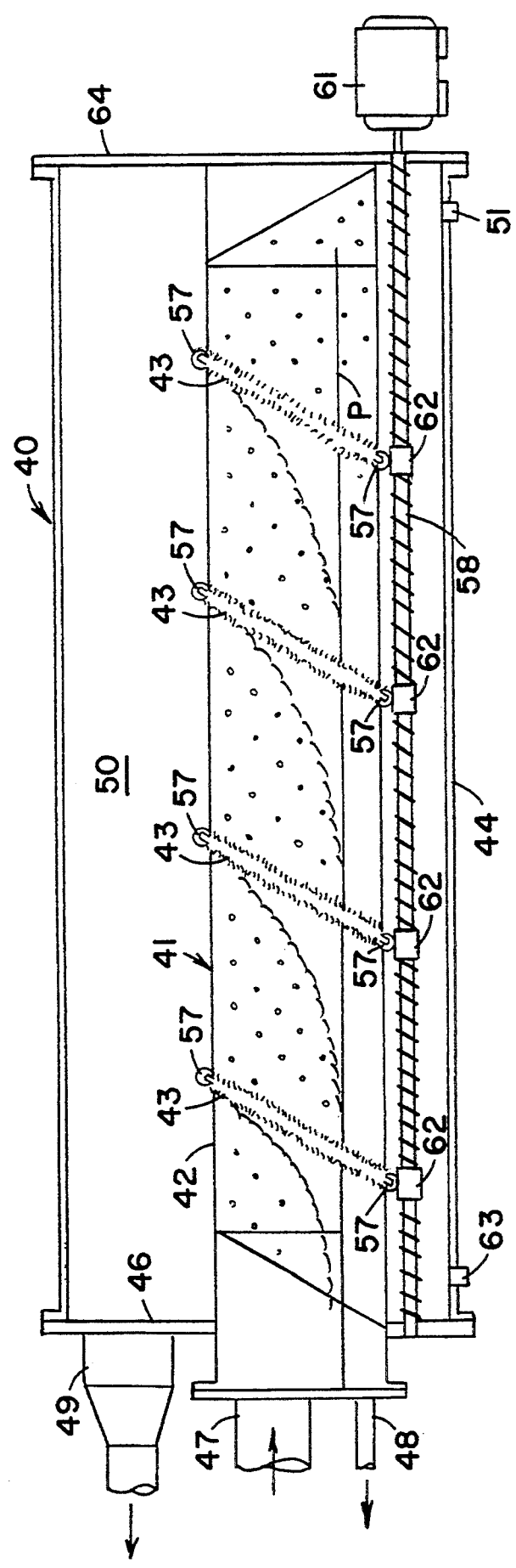
FIG. 5 is a view similar to those of FIGS. 1 and 2 of a modified horizontal brushed film evaporator according to the invention.

The embodiment of the brushed film evaporator shown in FIG. 5 and generally designated by the reference numeral 40 has a plurality of plate type heat exchange elements 41 with trapezoidal plates 42 rather than the rectangular plates 12 of the elements 11 shown in FIGS. 1-3. In other respects the elements 41 and their arrangement in mutually parallel relationship within the housing 44 is like that of the elements 11 in the housing 14.

A plurality of brush assemblies 43, like the assemblies 13, are mounted for reciprocating movement over the surface of the plates 42. However, in the embodiment of FIG. 5 the actuating mechanism for moving the brush assemblies 43 is a screw threaded driving rod 58 driven by a motor 61. The frames of the brush assemblies 43 are equipped with rollers 57 which ride on the upper and lower edges of the plate elements 41 as in the case of the embodiment of FIGS. 1-3. The frames of the brush assemblies 43 are pivotably secured to internally threaded sliders 62 which move the frames to the left and then to the right in the sense of FIG. 5 as the screw threaded driving rod 58 is turned by the reversing motor 61.

Another respect in which the apparatus of FIG. 5 differs from that of FIGS. 1 and 2 is that the housing wall 64 shown at the right in FIG. 5 is flat, like the left end wall 46. This permits the brush assemblies 43 to traverse the entire surface of the trapezoidal plates 42.

In other respects the embodiment of FIG. 5 resembles that of FIGS. 1 and 2, having a heating medium inlet 47, a vent gas outlet 48; an outlet 49 for vapors generated by evaporation of liquid, a space 50 for the vapors to collect, an inlet 51 for feed liquid and a condensate outlet 63.

Figure 6:
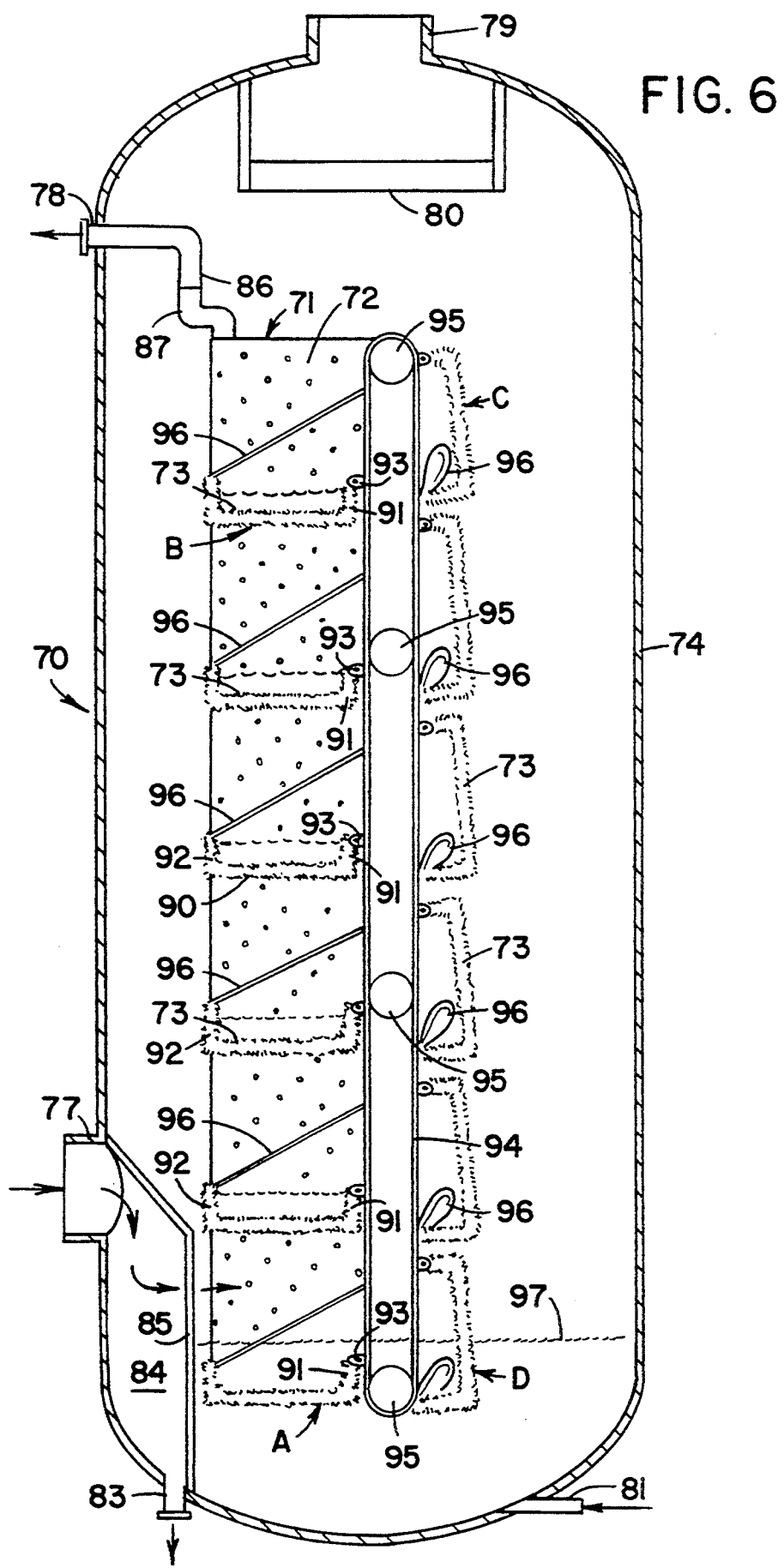
FIG. 6 is a sectional side view of a vertical plate element brushed film evaporator of the invention.

The liquid distribution brushing and cleaning concepts of the invention can also be employed in a vertically arranged evaporator, as illustrated by the evaporator 70 of FIG. 6, in which brush assemblies 73 traverse the surfaces of vertically arranged plate type heat exchange elements 7. The plate heat exchange elements 71 are generally like the elements 11 of FIGS. 1–3, consisting of pairs of spaced parallel plates 72 joined at their peripheries. As in the arrangement illustrated in FIG. 3, a stack or package comprising a plurality of elements 71 can be employed in the evaporator 70 of FIG. 6, although the inlet 77 for the heating medium is positioned to admit steam or other heating fluid through side edges of the elements 71, rather than through end edges of the elements as in the case of the elements 11.

The housing 74 can be generally cylindrical or rectangular in horizontal section, with a vapor outlet 79 at the top of the housing 74. The inlet 77 for the heating medium and an outlet for vent gases 78 are positioned near the bottom and top ends of the plate type elements 71. Liquid to be evaporated enters the housing 74 through the inlet 81 and condensed heating medium is discharged via the pipe 83.

Vapors arising from the evaporation of liquid as a result of indirect heat exchange with the heating medium exits the housing 74 through the opening 79 at the top of the housing. An entrainment separator 80 is shown below the vapor outlet 79 for removing entrained liquid from the exiting vapor.

Steam or other heating vapor enters through the inlet 77 to a plenum 84 which extends across all of the heat exchange elements 71 in a direction perpendicular to the plane of the cross section illustrated in FIG. 6. Each heating element 71 has an opening at a lower portion of its edge at 85 through which the heating medium can enter to pass upward between the plates 72 of the elements 71. A horizontally extending header 86 also extends across all of the plate heating elements 71 at the top of the elements 71 and the interior of each element 71 is connected to the header 86 by a vent gas exhaust pipe 87. Alternatively all of the heating elements 71 could have openings at their top edges communicating directly with a common header for exiting vent gases.

The brush assemblies 73 are shaped as troughs 90 with an upstanding inner wall 91 and an upstanding outer wall 92. The edges of the trough 90, including the walls 91 and 92, have bristles extending perpendicular to the plane of the drawing of FIG. 6 and contacting the surfaces of plates 72 on opposite sides of the troughs 90 to distribute liquid to the surfaces of the plates 72 and to remove deposited solids from the plates 72.

The inner wall 91 of each brush assembly trough 90 is connected by a pivot 93 to an endless belt 94 carried by a plurality of pulleys or rollers 95 for clockwise movement. The outer wall 92 of each brush assembly trough 90 is connected to the endless belt 94 by a flexible line 96 which can be a metal wire or a cord of nylon or other material selected for resistance to elevated temperatures and the chemical composition of the liquid being evaporated.

A pool 97 of liquid to be evaporated is introduced into the housing 74 through the liquid inlet 81. Liquid fills a brush assembly trough when the trough 90 moves through the pool of liquid at the bottom of the path of travel of the trough 90 as illustrated at A in FIG. 6. The trough 90 carried by the motion of the endless belt 94 moves upward distributing the liquid to the surfaces of the plates 72 and brushing the plate surfaces clean.

After a brush assembly trough 90 passes the position illustrated at B in FIG. 6, the trough 90 is pulled over the top of the endless belt 94, and collapses against the belt 94 into the position shown at C in FIG. 6 for its return trip downward to be refilled with liquid after it passes through the position D of the figure, to scoop up liquid as shown at A in FIG. 6.

As the brush assemblies 73 make their clockwise circuit carried by the endless belt 94, which can be driven by any suitable means such as a motor (not illustrated) driving one or more of the pulleys 95, the bristles extending from the sides of each trough 90 distribute water or other liquid to the vertical surfaces of the plates 72 for evaporation, while brushing deposited solids away.

Several presently preferred embodiments of a brushed film evaporator have been described in detail. Those skilled in the art to which this invention pertains will appreciate that various modifications and applications of the invention can be made without departing from the spirit and scope of the invention.

What is claimed is:

1. An indirect heat transfer evaporator having a plurality of spaced, parallel heat exchange elements comprising pairs of plates joined together at the plate peripheries, which elements extend vertically in a housing, means for introducing a heating medium into interior spaces between the plates of each pair of plates for evaporating liquid on the outer surfaces of the plates and including at least one brush assembly comprising a plurality of pairs of trough shaped brushes carried by an endless belt for vertical movement for distributing liquid along the length of the plate elements to outer, opposite side surfaces of the plate elements from a pool of liquid at the housing bottom.

2. An evaporator comprising a housing with an inlet for liquid to be evaporated and an outlet for vapor generated by the evaporation of the liquid, a plurality of spaced parallel heat exchange elements within the housing, each heat exchange element comprising a pair of plates joined together at the plate peripheries and including means for entry of a heating medium into an interior space between the plates of each pair of plates, the plates having vertically disposed outer surfaces for the evaporation of liquid on the outer surfaces by indirect transfer of heat from the heating medium, and including a plurality of brush assemblies comprising pairs of opposed brushes for distributing liquid to the outer plate surfaces of the plates of said heat exchange elements from a pool of liquid at the bottom of the housing and means for moving the brush assemblies with respect to the plate surfaces along the length of the heat exchange elements, wherein the means for moving the brush assemblies includes a double-acting piston and cylinder for imparting horizontal reciprocating movement to the brush assemblies.

3. An evaporator comprising a housing with an inlet for liquid to be evaporated and an outlet for vapor generated by the evaporation of the liquid, a plurality of spaced parallel heat exchange elements within the housing, each heat exchange element comprising a pair of plates joined together at the plate peripheries and including means for entry of a heating medium into an interior space between the plates of each pair of plates, the plates having vertically disposed outer surfaces for the evaporation of liquid on the outer surfaces by indirect transfer of heat from the heating medium, and including a plurality of brush assemblies comprising pairs of opposed brushes for distributing liquid to the outer plate surfaces of the plates of said heat exchange elements from a pool of liquid at the bottom of the housing and means for moving the brush assemblies with respect to the plate surfaces along the length of the heat exchange elements, wherein the means for moving the brush assemblies includes a motor driven screw threaded rod for imparting horizontal reciprocating movement to the brush assemblies.

4. An evaporator comprising a housing with an inlet for liquid to be evaporated and an outlet for vapor generated by the evaporation of the liquid, a plurality of spaced parallel heat exchange elements within the housing, each heat exchange element comprising a pair of plates joined together at the plate peripheries and including means for entry of a heating medium into an interior space between the plates of each pair of plates, the plates having vertically disposed outer surfaces for the evaporation of liquid on the outer surfaces by indirect transfer of heat from the heating medium, and including a plurality of brush assemblies comprising pairs of opposed brushes for distributing liquid to the outer plate surfaces of the plates of said heat exchange elements from a pool of liquid at the bottom of the housing and means for moving the brush assemblies with respect to the plate surfaces along the length of the heat exchange elements, and wherein the brush assemblies include trough shaped members for scooping liquid from a pool of liquid at the housing bottom, the means for moving the brush assemblies comprising an endless belt for moving the brush members vertically to distribute liquid to the plate surfaces.

* * * * *